United States Patent [19]

Kestel

[11] Patent Number: 4,871,031

[45] Date of Patent: Oct. 3, 1989

[54] ROTARY HOE TOOL

[76] Inventor: Frederick J. Kestel, Rte. 1, Box 44, New Lenox, Ill. 60451

[21] Appl. No.: 285,998

[22] Filed: Dec. 19, 1988

[51] Int. Cl.$^4$ .............................................. A01B 21/04
[52] U.S. Cl. .................................... 172/544; 172/556
[58] Field of Search ................. 172/556, 554, 544, 96, 172/545, 540, 543, 548

[56] References Cited

U.S. PATENT DOCUMENTS

| | | | |
|---|---|---|---|
| 1,757,511 | 5/1930 | Brewer | 172/554 X |
| 2,054,129 | 9/1936 | Kelsey | 172/96 |
| 2,199,954 | 5/1940 | Kelsey | 172/96 |
| 2,366,624 | 1/1945 | Kelsey | 172/544 |
| 2,438,707 | 3/1948 | Kropp | 172/556 X |
| 2,603,139 | 7/1952 | Johnson | 172/544 |
| 2,816,499 | 12/1957 | Osthaus | 172/96 |
| 2,888,993 | 6/1959 | Dunning | 172/556 X |
| 3,170,421 | 2/1965 | Norris | 172/548 X |
| 4,114,697 | 9/1978 | Carlucci | 172/556 |

FOREIGN PATENT DOCUMENTS 2541848  9/1984  France ................................. 172/544

Primary Examiner—Richard J. Johnson
Attorney, Agent, or Firm—Ernest Kettelson

[57] ABSTRACT

A rotary hoe tool of the type wherein one or more of such rotary hoe tools are mounted for rotation on one or more axles supported by a frame assembly for cutting and digging into the ground as they are rotated. A plurality of elongated teeth or cutting tools are pivotally mounted for limited pivotal movement on a rotatable hub, so when each tooth or cutting tool begins to dig into the ground as the hub rotates it to that position, the tooth or cutting tool itself pivots rearwardly a permitted limited distance against the pressure and resistance of the ground. Such pivotal movement compresses a wedge shaped resilient and compressible member interposed between each pair of adjacent teeth or cutting tools, which limits the rearward pivotal movement of such tooth or cutting tool and which then propels it forward as the initial pressure or resistance dissipates and the compressible member expands back to its non-compressed state. This gives the cutting tools a kicking action as they are worked into, through and up out of the soil to better loosen the soil and to better cut grasses and weeds.

10 Claims, 5 Drawing Sheets

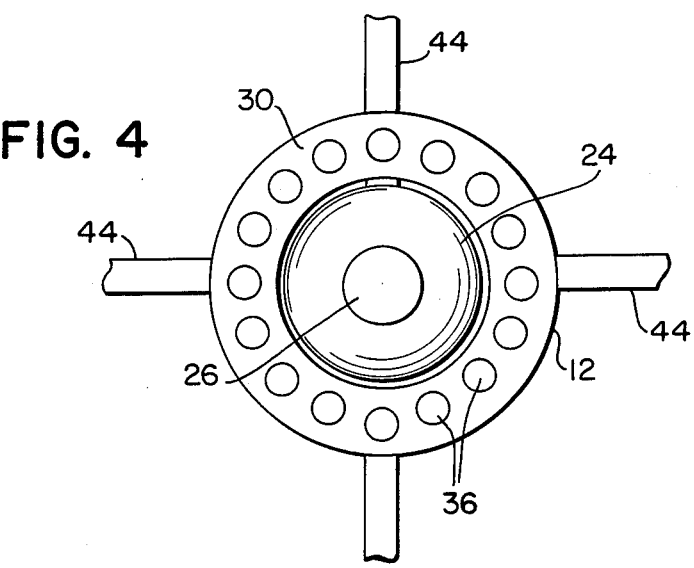
FIG. 4
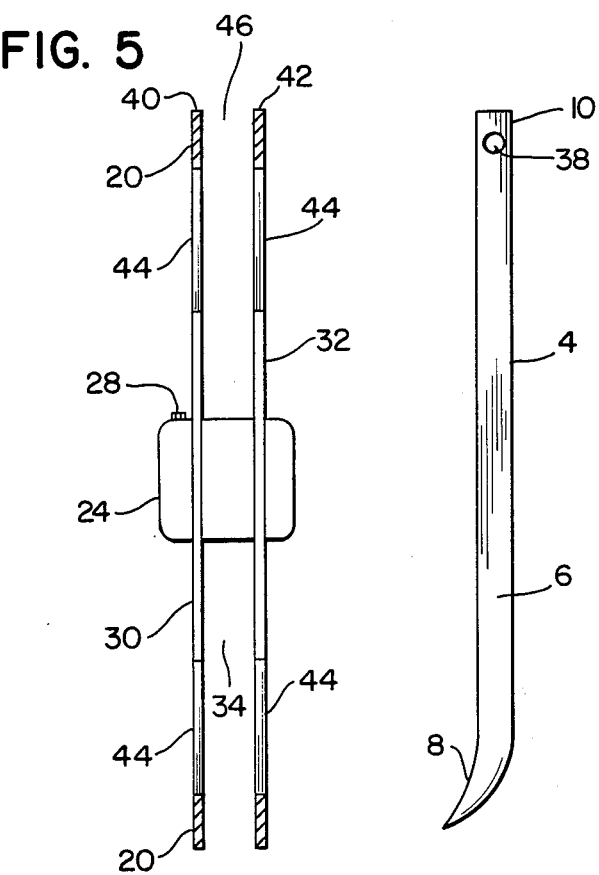
FIG. 5
FIG. 6

ROTARY HOE TOOL

BACKGROUND OF THE INVENTION

This invention relates to the field of rotary hoe tools, a plurality of which are mounted on a frame assembly for use as a field type agricultural implement.

Prior art tools of this general type include those disclosed in the following U.S. patents.

U.S. Pat. No. 4,114,697 discloses an agricultural implement having a plurality of finger elements of wire material mounted on a rotating hub, and a plurality of such hubs with finger elements mounted for rotational working contact with the ground on a frame assembly.

U.S. Pat. No. 3,139,049 discloses a power driven rotary plow comprising a plurality of plow shares affixed to respective spokes or arm members which are mounted for limited pivotal movement on a fully rotational hub.

U.S. Pat. No. 2,888,993 discloses a lawn edger having a plurality of nails extending from an annular rubber ring mounted on a rotatable hub.

U.S. Pat. No. 2,816,499 discloses a rotary tilling implement having a plurality of tines mounted for limited rotational movement on the rim of a wheel which rotates on the axle of a tilling implement. A plurality of such wheels are mounted on the axle of the tilling implement.

U.S. Pat. No. 2,603,139 discloses a rotary tilling apparatus having a plurality of hook-shaped tines mounted for limited pivotal movement on radial arm members extending from a rotatable hub mounted on an axle of the tilling apparatus.

U.S. Pat. No. 2,438,707 discloses a rotary tiller tooth and mounting which has a plurality of curved cutting blades of spring material mounted on a rotatable hub, each such cutting blade having a coil or torsion spring formed adjacent its connection to the hub to provide a spring back action when the cutting blades enter into and exit from the ground as the hub rotates.

U.S. Pat. No. 2,366,624 discloses a tine assembly in which a plurality of curved torsion spring tines are mounted on a rotatable hub in which the tines are resilient enough to spring back when contacting a stone or other immovable object embedded in the ground.

U.S. Pat. No. 2,199,954 discloses an agricultural implement for rotary tilling of the soil in which the tines or cutting tool members are mounted to a resilient rubber ring around a rotatable hub, wherein the rubber ring mounting provides resilience and flexibility to enable the cutting members to move both laterally and axially or circumferentially when they contact an immovable obstruction in the ground.

U.S. Pat. No. 2,054,129 discloses an agricultural implement having cutting tools mounted on a rotatable hub, the cutting tools being supported in disks of resilient material such as rubber to cushion shock of the cutting implements as they dig into the ground.

U.S. Pat. No. 1,757,511 discloses a cultivator reel having tines which are pivotally mounted for limited pivotal movement on a rotatable hub and biased toward the normal cutting and digging position by coil springs. The tines project through arcuate slots in a drum, the arcuate slots limiting the pivotal movement of the tines as the assembly rotates with the tines digging into the ground.

The rotary hoe tool assembly in accordance with the present invention comprises a plurality of elongated teeth which are pivotally mounted on a rotatable hub for limited arcuate movement both forwardly from as well as rearwardly from a normal unstressed position extending radially from the hub. Wedge shaped compressible spacers are interposed between the teeth to limit such forward and rearward arcuate movement as well as to supply compressive biasing rebound force to the teeth when pressure first applied against such compressible spacers is released. The teeth are free to rebound forwardly of their normal unstressed radial position when the initial rearward pressure is released, so the kicking action of the teeth when they dig into and plow through soil is enhanced. Each tooth as it enters the ground and has rearward pressure applied is able to compress more than the immediately following spacer so there is stored up energy in a plurality of compressible spacers to kick the teeth forward as rearward pressure against them is released. This further enhances the kicking action of the teeth of the rotary hoe tool assembly in accordance with the present invention.

SUMMARY OF THE INVENTION

It is an object of the invention to provide a rotary hoe tool assembly having a plurality of elongated teeth pivotally mounted on a rotatable hub for limited arcuate movement both forward and rearward as the teeth are rotated into, through and out of the ground, in which the teeth are free to pivot forward of their normal unstressed radial position as well as rearward.

It is an object of the invention to provide a rotary hoe tool assembly having a plurality of elongated teeth pivotally mounted on a rotatable hub for limited arcuate movement in which compressible spacers are interposed between the teeth to limit such movement and to provide a compressive biasing force to store energy when the teeth are pressed in one direction against such spacers and to propel the teeth in the opposite direction for the limited distance when such pressure is released.

It is an object of the invention to provide a rotary hoe tool assembly having a plurality of elongated teeth pivotally mounted on a rotatable hub for limited arcuate movement in which a plurality of individual compressible spacing members are separately mounted between the teeth which may be individually and separately removed and replaced in the event one becomes damaged.

BRIEF DESCRIPTION OF THE DRAWING

FIG. 4 is an elevation view of the hub member of the rotary hoe tool assembly with the elongated teeth removed, the four spokes which support the outward concentric ring member on which the spacers are carried being shown in part as they extend from the hub with their outer end portions broken away.

FIG. 5 is an end elevation view of the hub member and spokes extending therefrom and the outward concentric ring member supported by the spokes being shown at each end of the respective spokes in section, the elongated teeth which are mounted between the spaced apart flanges of the hub and annular rings of the concentric ring member being removed.

FIG. 6 is an elevation view of one of the elongated teeth which is pivotally mounted on the hub of the rotary hoe tool assembly.

DESCRIPTION OF PREFERRED EMBODIMENT

Figure 1:
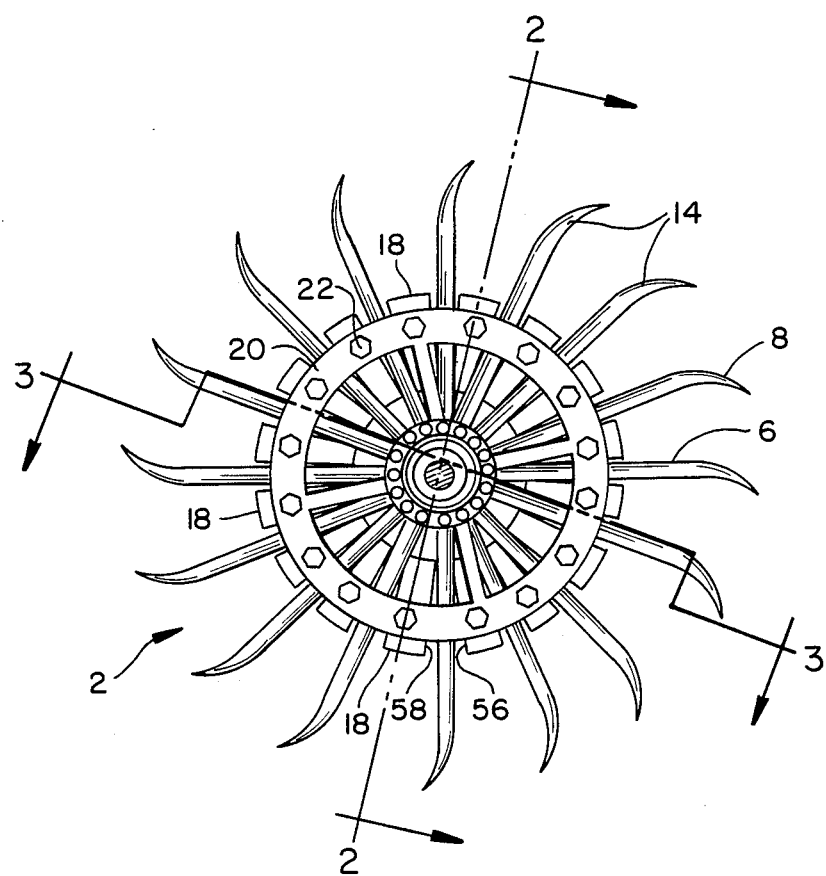
FIG. 1 is an elevation view of the rotary hoe tool assembly in accordance with this invention.
Figure 2:
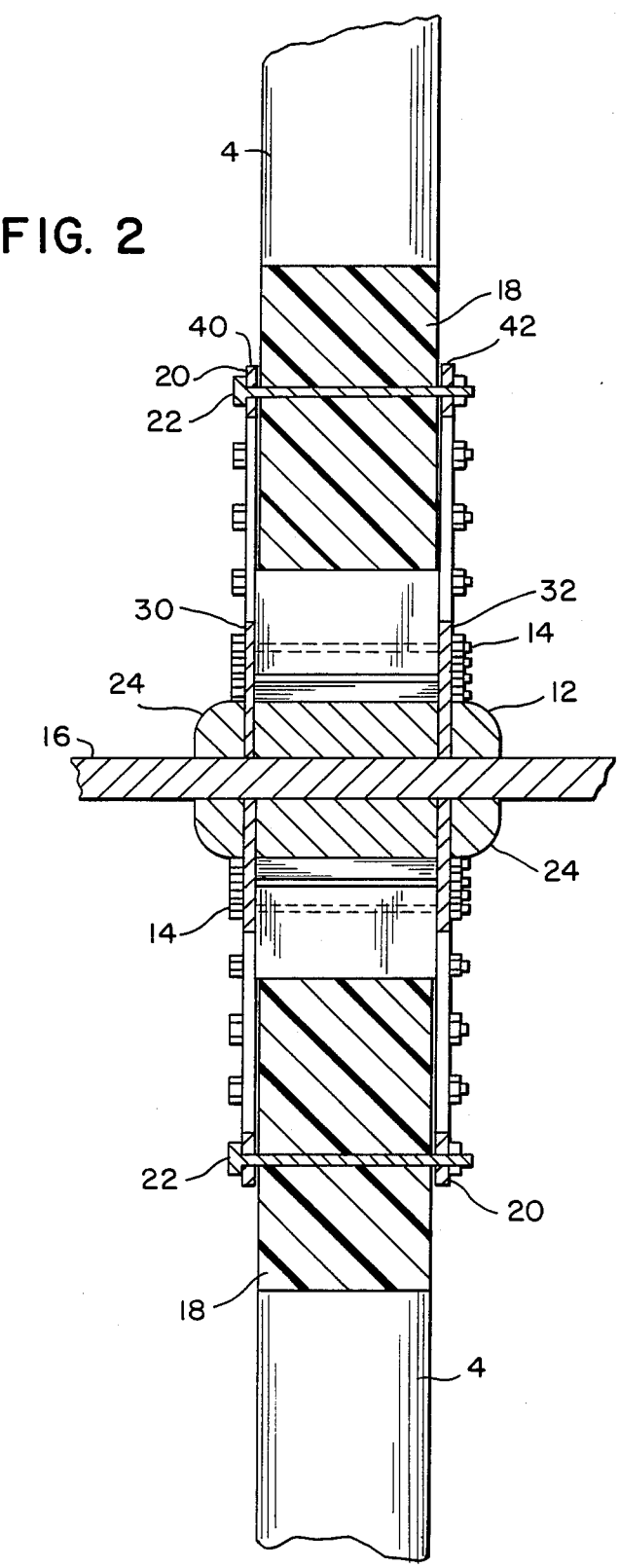
FIG. 2 is an enlarged section view taken on line 2—2 of FIG. 1.
Figure 3:
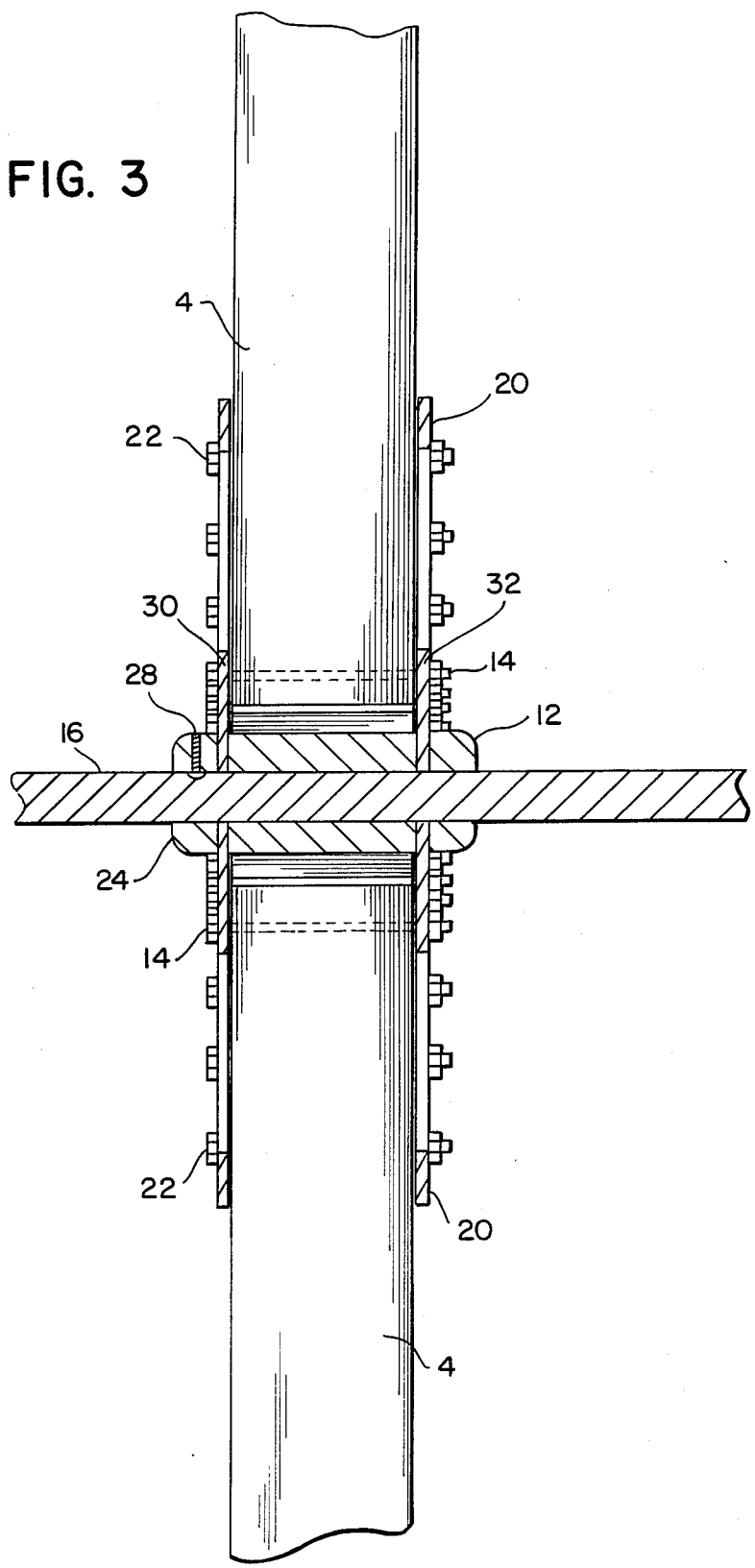
FIG. 3 is an enlarged section view taken on line 3—3 of FIG. 1.
Figure 7:
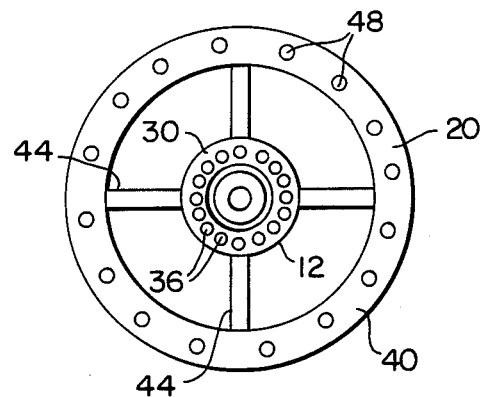
FIG. 7 is a side elevation view of the hub and outward concentric ring member shown with the elongated teeth and spacers removed.
Figures 8, 9:
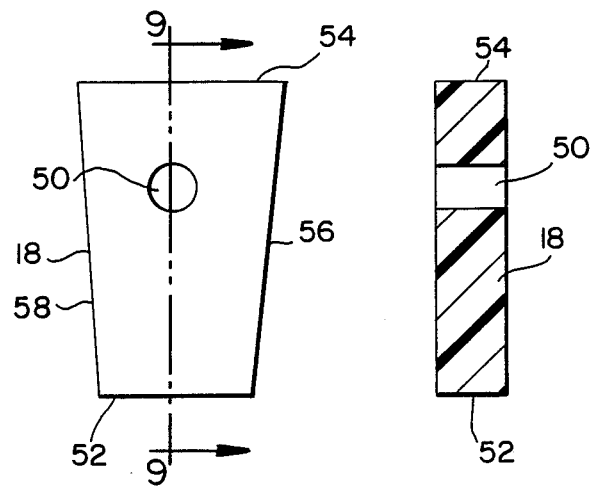
FIG. 8 is an elevation view of one of the compressible spacer members for use in the rotary hoe tool assembly.
FIG. 9 is a section view taken on line 9—9 of FIG. 8.

A rotary hoe tool assembly 2 in accordance with this invention comprises a plurality of teeth 4 for cutting and digging into the ground, each having an elongated shank 6, a sharp pointed free end 8 and a pivot end 10 which is pivotally connected to a hub member 12 by a pivot pin or bolt 14.

The hub 12 is secured to an axle 16 for rotation therewith. A plurality of rotary hoe assemblies 2 may be mounted on the axle 16 in spaced apart relationship and supported for rotation on the frame of an agricultural implement for large field use. The rotary hoe tool in accordance with this invention can, of course, also be mounted for rotation on the axle of an implement for use in a garden, or as an edger, in which case only one of the rotary hoe tools in accordance with this invention may be used.

The teeth 4 are pivotally connected to the hub member 12 and extend radially outwardly therefrom. A plurality of somewhat resilient and compressible wedge-shape spacer members 18 are positioned between adjacent teeth 4 to permit the teeth 4 to pivot a limited arcuate distance on their pivot pins 14, to also limit the arcuate distance they may pivot, and to provide a biasing force to normally bias the teeth 4 back to their original position in which the adjacent wedge-shaped spacer members 18 are in their original expanded and non-compressed state. As the teeth 4 pivot on pivot pins 14, they bear against and begin to compress the wedge-shaped spacer member 18 adjacent thereto on the side facing the direction of such pivotal movement.

The wedge-shaped spacer members 18 are held in position by a circular ring member 20 which is outwardly from and concentric with the hub member 12, and by arcuately spaced apart pivot pins or bolts 22 through the ring member 20 and through each wedge-shaped spacer member 18. The spacer members 18 are also mounted for limited pivotal movement on the pivot pins or bolts 22 which permits transmitting pivotal movement forces of one tooth 4 to a plurality of adjacent teeth 4 and a plurality of compressive wedge-shaped spacer members 18 between such adjacent teeth both in the arcuate direction which compresses such spacer members 18 and in the opposite arcuate direction wherein said compressed spacer members exert their combined biasing force to bias he said teeth 4 back toward their original position as opposing pressure thereon is released.

The hub member 12 includes a mounting sleeve 24 which is mounted on the axle 16 received through the central bore 26 of sleeve 24 and secured to the axle 16 for rotation therewith by one or more set screws 28. A pair of spaced apart annular flanges 30 and 32 are secured to the mounting sleeve 24 which provide an annular space 34 therebetween to receive the pivot ends 10 of the teeth therebetween.

Each annular flange 30 and 32 have a plurality of aligned apertures 36 therethrough in annular spaced apart relationship to receive the pivot pins 14 which extend through respective ones of apertures 38 through the pivot end 10 of each tooth 4 to pivotally secure the teeth 4 to the hub member 12.

The circular ring member 20 includes a pair of annular rings 40 and 42 which are supported in spaced apart relationship outward from and concentric with respective annular flanges 30 and 32 by spokes 44 which are welded or otherwise secured at one of their ends to the outer circumference of annular flange 30 and 32 respectively and at their opposite end to the inner circumference of annular rings 40 and 42 respectively.

The spaced apart annular rings 40 and 42 provide an annular space 46 therebetween to receive the shanks 6 of teeth 4 as well as the compressible wedge-shaped spacer members 18 which are interposed between respective ones of the teeth 4. The spacer members 18 are secured between the annular rings 40 and 42 by the pivot pins or bolts 22 which extend through respective ones of the annularly spaced apart apertures 48 through annular rings 40 and 42 in alignment with respective apertures 48 in each ring and through the aperture 50 of each compressible wedge shaped spacer member 18.

The compressible wedge shaped spacer members 18 are made of a durable but somewhat compressible material such as hard rubber which can be compressed by pressure in one direction and which provide a biasing force in the opposite direction when the initial pressure is released and the spacer members return to their non-compressed, expanded state.

The compressible wedge-shaped spacer members 18 have a radially extending inner end 52 which is shorter than their outer end 54, a forward side edge 56 which tapers radially inwardly from the outer end 54 to the inner end 52 and a rearward side edge 58 which also tapers radially inwardly from the opposite side of the outer end 54 to the opposite side of the inner end 52.

The length of the inner end 52 of each wedge-shaped spacer member 18 is equal to the distance between adjacent teeth 4 at the points thereon which face such inner end 52 when the spacer member is secured to the circular ring member 20 by its respective pivot pin or bolt 22 and the adjacent teeth 4 are secured to the hub member 12 by their respective pivot pins or bolts 14. In other words, the inner end 52 of each spacer member 18 touches and abuts against the facing portion of each adjacent tooth 4.

The length of the outer end 54 of each wedge-shaped spacer member 18 is shorter than the distance between adjacent teeth 4 at the points thereon which face such outer end 54 when the spacer member is secured to the circular ring member 20 by its respective pivot pin or bolt 22 and the adjacent teeth are secured to the hub member 12 by their respective pivot pins or bolts 14. In other words, the outer end 54 of each spacer member 18 does not touch or abut against the facing portion of each adjacent tooth 4 when the teeth 4 are in their normal unstressed position.

The first and second tapering side edges 56 and 58 of the spacer members 18 do not touch the adjacent teeth 4 except at the very bottom ends which join the inner end 52 when the teeth 4 are in their normal unstressed position. They are held in such normal unstressed position, spaced apart their normal distance from each other, by the inner end portions of the wedge-shaped spacer members 18 which do touch and bear against the adjacent teeth 4 on each side.

When one of the teeth 4 has pressure applied in the direction toward an adjacent tooth 4, such as when it digs into the ground during rotation of the rotary hoe tool, the pressured tooth begins to pivot on its pivot pin 14 which begins to first compress the portion of the inner end 52 of the adjacent spacer member 18. Secondly, it begins to force the adjacent tooth 4 slightly in the same direction which in turn begins to compress the portion of the inner end 52 of the next adjacent spacer 18. If the resistance against the first tooth 4 is great enough, the same forces may be transmitted to a third tooth to begin to compress the inner end 52 of its adjacent spacer member 18. This stored up compressive energy of multiple spacer members 18 provides a multiplied biasing force in the opposite direction to assist the first tooth and successive teeth in overcoming the initial resistance force.

The portions of the spacer member 18 at their outer end 54 limit the pivotal movement the teeth 4 are able to make. As the tooth 4 pivots rearwardly on its pivot pin 14 as a result of rearward pressure, its shank 6 approaches the outer end 54 of the rearward adjacent spacer member 18 and when it bears against such spacer member 18 at its outer end 54 the pivot bolt 22 which secures the spacer member 18 in place on the circular ring member 20 holds the spacer 18 and tooth 4 bearing against its outer end 54 from pivoting in that direction any farther. At such time, the shank 6 of the tooth 4 is flush against the adjacent forward side edge 56 of the wedge-shaped spacer member 18 next adjacent to the rear in the direction in which the rearward pressure is being applied.

When the rearward pressure against a tooth 4 is released, the stored up energy in the compressible spacer members 18 is released to bias and pivot the tooth 4 forwardly in the opposite forward arcuate direction on its pivot pin 14. It is free to pivot forwardly in such opposite direction not only up to its normal unstressed position, but even beyond since there is a space between the shank 6 of each tooth 4 and the next adjacent spacer member 18 at its outer end 54 when the tooth is in its normal unstressed position. A radially inward portion of the shank 6 will bear against the inner end 52 of such forward adjacent spacer member 18 before the outer end 54 is reached. However, since the wedge-shaped spacer member 1 is pivotally mounted on the circular ring member 20 by a pivot pin 22, the rapid forward bias against tooth 4 when reverse pressure is suddenly released enables the shank 6 to provide leveraged mechanical advantage force against the inner end 52 of the forward adjacent spacer member 18 to rotate it slightly on its pivot pin 22 in the forward arcuate direction until the forward edge of the shank 6 of the tooth 4 comes flush against the rearwardly facing side edge 58 of the forward adjacent spacer member 18.

This construction provides a rotary hoe tool assembly 2 in which the pivotally mounted teeth 4 provide an improved digging and cutting action in the ground for both better loosening of the soil and better cutting of grasses and weeds. As the hub member 12 and concentric circular ring member 20 rotate in one direction, the teeth 4 are initially caused to pivot in the opposite direction when they make initial contact with the ground. This compresses the next rearward adjacent spacer member 18 as well as applying compressive force to the second following spacer member 18. Such built up compressive force biases the teeth 4 forwardly with the stored energy of multiple compressive spacer members 18 with more effective forward pivotal motion while at the same time being rotated forwardly on the hub member 12. The forward pivotal motion of the teeth imparted by the stored energy of multiple compressive spacer members 18 is not artificially limited by any mechanism which prevents the teeth from rebounding forward beyond their normal unstressed position. The teeth 4 in accordance with this invention are free to pivot forwardly on rebound beyond their normal unstressed position by virtue of the construction described herein to thereby provide improved forward pivotal and rebound action of the teeth 4 as they are rotated on the hub 12 to enter into and exit from the soil.

When the teeth 4 exit from the soil and have no forward or rearward pressure applied thereagainst, the adjacent compressive spacer members 18 are free to return to their non-compressed, expanded state, wherein their inner ends 152 which bear against the shanks 6 of adjacent teeth 4 move the teeth 4 to their normal position and hold them in that position until they again make contact with the ground or other item which applies rearward pressure to them as the hub 12 is rotated forwardly.

The individually mounted compressible spacer members 18 can be individually removed and replaced by virtue of the construction in accordance with this invention, in the event one of them becomes damaged without removing and replacing an entire assembly of compressive material such as a continuous rubber ring for example in which teeth have been mounted in some of the prior art rotary hoe tools.

The pivot bolts 22 through the apertures 48 of annular rings 40 and 42 of the circular ring member 20 may be tightened and loosened as desired to adjust the pressure against the compressible spacer members 18 mounted therein. The shanks 6 of the teeth 4 are preferably slightly narrower than the width of the annular space 46 between the annular rings 40 and 42 through which the teeth 4 extend so they are free to pivot forwardly and rearwardly within such annular space the limited distance provided by the adjacent pivotally mounted wedge-shaped spacer members 18. The fit should be close so the teeth 4 do not wobble from side to side, but with just enough clearance to permit pivotal movement of the teeth 4 within the annular space 46 without undue frictional drag by the spaced apart annular rings 40 and 42 of the circular ring member 22.

I claim:

1. A rotary hoe tool assembly comprising rotatable hub means rotatable in a forward and rearward direction of rotation, a plurality of elongated tool members for cutting and digging into the ground each having a pivot end for pivotal connection to said hub means and a working free end, each of said elongated tool members being pivotally connected to said rotatable hub means for limited pivotal movement thereon in the same forward and rearward directions as said hub means is rotatable, each of said tool members being adjacent another tool member in a forward direction of rotation to constitute a first pair of adjacent tool members and also adjacent another tool member in the opposite rearward direction of rotation to constitute a second pair of adjacent tool members, resilient spacing and biasing means changeable between a first unbiased state and a second biased state having respective portions interposed between and in engagement with both tool members in each of said pairs of adjacent ones of said plurality of tool members, said resilient spacing and biasing means being spaced apart outwardly from said pivot ends of said tool members, said spacing and biasing means so positioned holding each of said tool members when in said first unbiased state in a first normal unstressed position a substantially equal distance from a forwardly positioned next adjacent tool member pivotally mounted on said hub means next adjacent in said forward direction of rotation and a rearwardly positioned next adjacent tool member pivotally mounted on said hub means next adjacent in said rearward direction of rotation, so also permit each of said tool members to pivot under pressure a substantially equal distance in both said forward and rearward directions of rotation from said first unstressed position to a second stressed position, to also limit such movement in both of said directions of rotation short of both said forwardly and rearwardly positioned next adjacent tools, and to propel each of said tool members from said second stressed position back toward said first unstressed position when said pressure is released said portions of said resilient spacing and biasing means extending continuously between respective ones of said adjacent tool members in each of said pairs with which each respective portion of said resilient spacing and biasing means is in engagement, whereby pivotal movement of one of said adjacent tool members toward the other transmits pressure against said other tool member in the same direction through said portion of said resilient spacing and biasing means therebetween.

2. A rotary hoe tool assembly comprising rotatable hub means rotatable in a forward and rearward direction of rotation, a plurality of elongated tool members for cutting and digging into the ground each having a pivot end for pivotal connection to said hub means and a working free end, each of said elongated tool members being pivotally connected to said rotatable hub means for limited pivotal movement thereon in the same forward and rearward directions as said hub means is rotatable, resilient spacing and biasing means having respective portions interposed between and in engagement with adjacent ones of said plurality of tool members to thereby hold each of said tool members so engaged by said respective portions of said resilient spacing and biasing means therebetween in a normal unstressed position at a substantially equal distance from a forwardly positioned next adjacent tool member pivotally mounted on said hub means next adjacent in said forward direction of rotation and a rearwardly positioned next adjacent tool member pivotally mounted on said hub next adjacent in said rearward direction of rotation, to also permit each of said tool members to pivot under pressure toward said rearwardly positioned next adjacent tool, to propel in the opposite direction toward said forwardly positioned next adjacent tool a distance beyond said normal unstressed position, and to thereafter return such tool member in the opposite direction to said normal unstressed position.

3. A rotary hoe tool assembly as set forth in claim 1, wherein said resilient spacing and biasing means comprises a plurality of separate resilient spacing and biasing members, respective ones of said separate resilient spacing and biasing members being interposed between each adjacent pair of said elongated tool members pivotally mounted on said hub means and support means to support said separate spacing and biasing members between each said adjacent pair of said elongated tool members.

4. A rotary hoe tool assembly as set forth in claim 3, wherein said plurality of separate resilient spacing and biasing members are made of materials which include hard rubber.

5. A rotary hoe tool assembly comprising rotatable hub means rotatable in a forward and rearward direction of rotation, a plurality of elongated tool members for cutting and digging into the ground each having a pivot end for pivotal connection to said hub means and a working free end, each of said elongated tool members being pivotally connected to said rotatable hub means for limited pivotal movement thereon in the same forward and rearward directions as said hub means is rotatable, resilient spacing and biasing means changeable between a first unbiased state and a second biased state interposed between adjacent ones of said plurality of tool members and spaced apart outwardly from their said pivot ends to hold each of said tool members when in said first unbiased state in a first normal unstressed position a substantially equal distance from a forwardly positioned next adjacent tool member pivotally mounted on said hub means next adjacent in said forward direction of rotation and a rearwardly positioned next adjacent tool member pivotally mounted on said hub means next adjacent in said rearward direction of rotation, to also permit each of said tool members to pivot under pressure a substantially equal distance in both said forward and rearward directions of rotation from said first unstressed position to a second stressed position, to also limit such movement in both of said directions of rotation short of both said forwardly and rearwardly positioned next adjacent tools, and to propel each of said tool members from said second stressed position back toward said first unstressed position when said pressure is released, wherein said resilient spacing and biasing means comprises a plurality of separate resilient spacing and biasing members, respective ones of said separate resilient spacing and biasing members being interposed between each adjacent pair of said elongated tool members pivotally mounted on said hub means and support means to support said separate spacing and biasing members between each said adjacent pair of said elongated tool members, wherein each of said separate resilient spacing and biasing members includes an outer end edge, an inner end edge, a forwardly facing side edge and a rearwardly facing side edge, said outer and inner end edges being substantially parallel and extending laterally toward said tool members of said adjacent pair, said inner end edge being in contact with and bearing against both tool members of said adjacent pair when they are in said first unstressed position, said outer end edge terminating at points spaced apart from both tool members of said adjacent pair when they are in said first unstressed position, said inner end edge being spaced apart radially from pivot ends of said tool members a lesser distance, said outer end edge being spaced apart radially from said pivot ends of said tool members a greater distance than said inner end edge.

6. A rotary hoe tool assembly as set forth in claim 5, wherein said outer end edge of said separate resilient spacing and biasing members is longer than said inner end edge thereof, said forwardly and rearwardly facing side edges thereof tapering and diverging as they extend from said outer end edge to said inner end edge of said separate resilient spacing and biasing members 7. A rotary hoe tool assembly as set forth in claim 5, wherein said support means to support said separate spacing and biasing members between each of said adjacent pairs of said elongated tool members includes an annular ring member positioned outwardly from and concentric with said hub means, each of said separate spacing and biasing members being pivotally mounted at arcuately spaced apart positions on said annular ring member, and positioning means to position said annular ring member outwardly from and concentric with said hub means.

8. A rotary hoe tool assembly as set forth in claim 7, wherein said positioning means to position said annular ring member outwardly from and concentric with said hub means includes a plurality of spokes extending between said annular ring member and said hub means.

9. A rotary hoe tool assembly as set forth in claim 8, wherein said annular ring member includes a pair of spaced apart circular members defining an annular space therebetween, said elongated tool members pivotally mounted on said hub means extending through said annular space and each being arcuately movable therein, said separate spacing and biasing members pivotally mounted between said spaced apart circular members and pivotally connected thereto interposed between each of said adjacent pairs of said elongated tool members.

10. A rotary hoe tool assembly as set forth in claim 9, wherein said hub means includes a sleeve member having a central bore to receive an axle therethrough, a pair of spaced apart annular flanges around said sleeve member to define an annular hub space therebetween, said pivot ends of said elongated tool members being received in said annular hub space and pivotally connected to said spaced apart annular flanges.

* * * * *